April 21, 1970 — O. W. JOHNSON — 3,507,451
SPRAY GUN NOZZLE

Filed Aug. 21, 1968 — 2 Sheets-Sheet 1

INVENTOR.
OCE W. JOHNSON
ATTORNEYS

April 21, 1970    O. W. JOHNSON    3,507,451
SPRAY GUN NOZZLE

Filed Aug. 21, 1968    2 Sheets-Sheet 2

INVENTOR.
OCE W. JOHNSON
BY
ATTORNEYS

United States Patent Office 3,507,451
Patented Apr. 21, 1970

3,507,451
SPRAY GUN NOZZLE
Oce W. Johnson, 305 Sourwood Drive,
Hampton, Va. 23366
Filed Aug. 21, 1968, Ser. No. 754,446
Int. Cl. B05b 7/08
U.S. Cl. 239—305                  7 Claims

ABSTRACT OF THE DISCLOSURE

A spray gun apparatus for the admixing and spray application of various coating materials having a nozzle cap readily attachable to a conventional spray gun and a separate material flow control arrangement which allows complete control of the proportions of various materials admixed while maintaining complete separate control of the fan shape and intensity of the resulting spray.

---

The invention described herein was made by an employee of the United States Government and may be manufactured and used by or for the Government for governmental purposes without the payment of any royalties thereon or therefor.

The present invention relates to devices for spraying a mixture of materials and more particularly to a spray gun and simplified nozzle assembly to be used for spraying mixtures of materials whereby the proportions of materials can be varied without affecting the control over the fan shape or spray intensity of the resulting mixture.

Numerous attempts have been made to develop a spray gun having a simple nozzle attachment which may be used to combine materials in varying proportions. However, these suffered from various shortcomings. In most cases, the fan control was combined with the mixture proportioning control or was so designed that the adjustment of one would affect the other. As a result, it was impossible to maintain proper control over the fan shape of the central spray while at the same time varying the proportions of materials in the spray mixture. Furthermore, because both controls were contained in the nozzle itself, a good deal of complex machining had to be done to obtain the desired configuration.

This not only made the nozzle rather complicated but increased the cost of production. In some embodiments, the materials to be added to the central spray material actually passed through the fan wings of this complex nozzle cap. Clogging was difficult to prevent and when it occurred, was difficult to clear up. Cleaning after use was also a more difficult procedure.

The present invention overcomes the shortcomings of the prior art in that the fan shape control is located in the conventional nozzle controls while the proportioning controls are located separately of the nozzle controls. Furthermore, the material to be added to the central spray does not pass through the nozzle fan wings, thus obviating the difficulties peculiar to that arrangement.

An object of the present invention is the provision of an improved spray gun having a simplified replaceable nozzle cap.

Another object of the invention is to provide a spray gun with means for controlling the proportion of mixed materials which is separate from the means for controlling the central nozzle fan shape.

A further object of the invention is to provide an improved nozzle assembly which is readily attachable to a conventional spray gun.

Still another object of the invention is to provide a spray gun having a simplified multipurpose spray nozzle cap which can proportionally mix and apply a mixture of at least three different materials.

Yet another object of the invention is to provide an improved nozzle assembly that is economical to manufacture and is simple to operate and maintain.

Other objects and advantages of the present invention will become more fully apparent from the following description of the annexed drawings illustrating a preferred embodiment and wherein.

Figure 1:
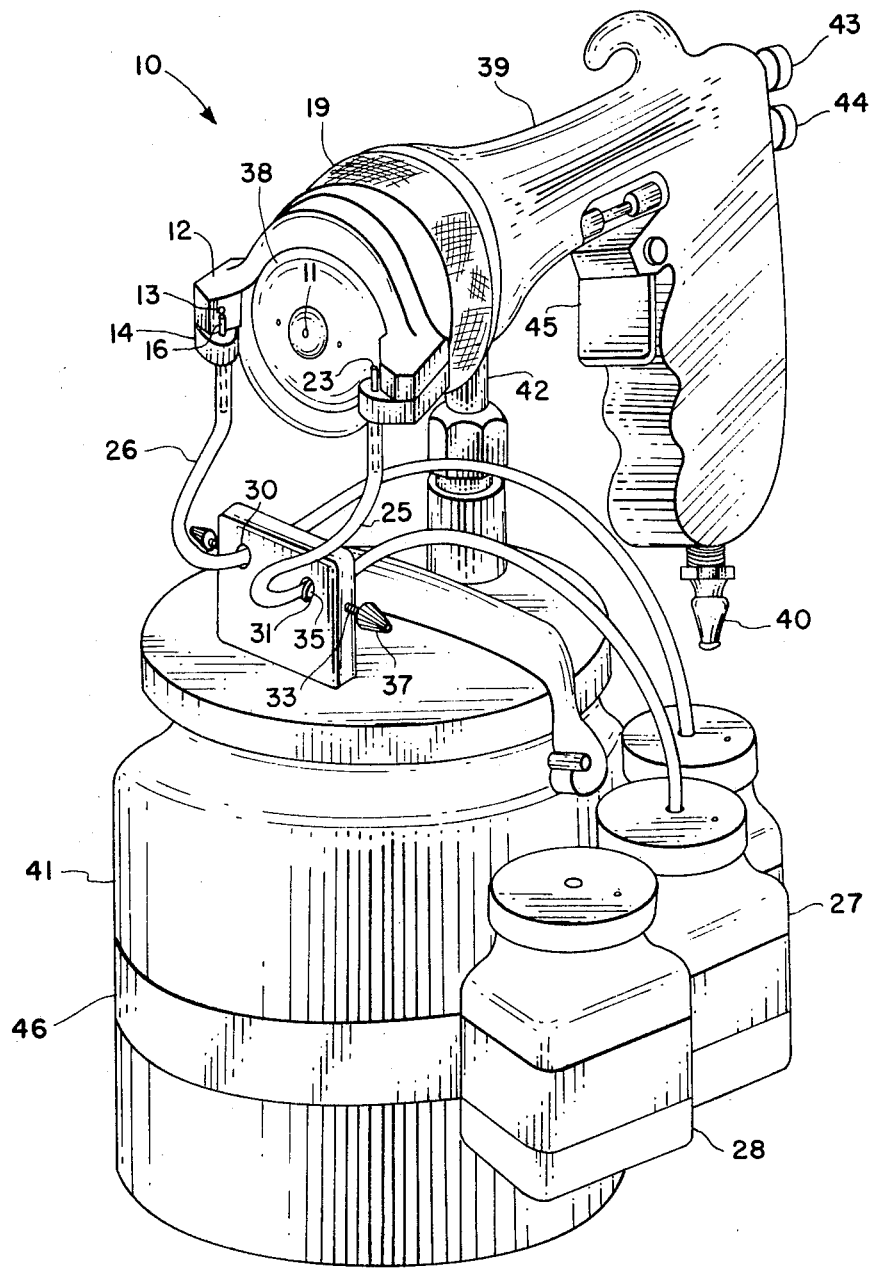
FIG. 1 illustrates a full perspective view of the present invention.

Referring now to the drawings wherein like reference characters designate like or corresponding parts throughout the several views and wherein the number 10 represents generally the improved spray gun apparatus, there is shown a nozzle cap 38 having an internally threaded rotatable collar 19 for coupling to a conventional spray gun 39 having the usual compressed air inlet 40, compressed air inlet on/off switch 45, central nozzle reservoir 41 containing base materials such as plastic resins, paints, etc., connector tube 42 whereby the base material to be sprayed out of the central nozzle 11 enters the gun 39, and conventional central nozzle spray controls comprised of the fan shape control 43 and the intensity control 44 whereby the central nozzle spray is adjustable in the conventional manner.

Figure 4:
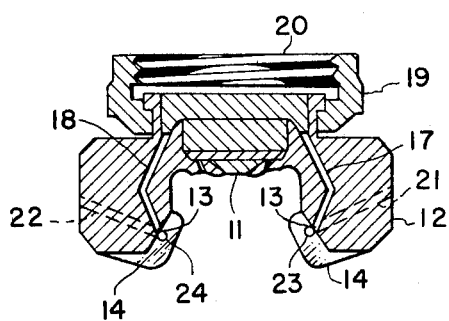
FIG. 4 shows a sectional view of the apparatus taken along line 4—4 of FIG. 2 looking in the direction of the arrows.

Formed in the front of the nozzle cap 38 is an inner nozzle outlet 11 through which a material is sprayed in the conventional manner. Conventional fan wings 12 having jet airstream passages 17 and 18 (FIG. 4) are an inherent part of the nozzle cap, and form the wing outlet means of the present invention by terminating in wing outlet holes 13. The wing outlet holes provide a high speed stream of air which, as hereinbefore mentioned, is variable so as to control the fan shape of the central spray emanating from the central nozzle 11.

Figure 3:
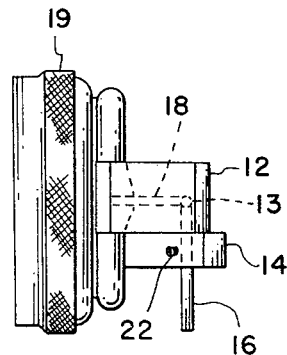
FIG. 3 shows a side view of the device.

To the bottom of the fan wings 12 may be attached by brazing or other suitable means metal blocks 14 having bores therein through which feeder tubes 15 and 16 pass. These feeder tubes 15 and 16 are held in place by fasteners 21 and 22 incorporated into the metal block 14. The fasteners 21 and 22 may be some type of screws or clamps, although the drawing (FIGS. 3 and 4) shows screws. The fasteners 21 and 22 allow the ready removal of said feeder tubes 15 and 16 so that they may be easily cleaned or replaced. These feeder tubes 15 and 16 are used to provide a method of adding to the central spray such materials as resin hardeners, acceleration catalysts, resin coloring materials, paint coloring materials and other similar materials which may be applied to a surface in spray form. These materials are contained in their own reservoir source containers 27 and 28. As illustrated in FIG. 1, these containers are readily fastened onto the conventional central nozzle reservoir 41 by a clamping band 46.

Figure 6:
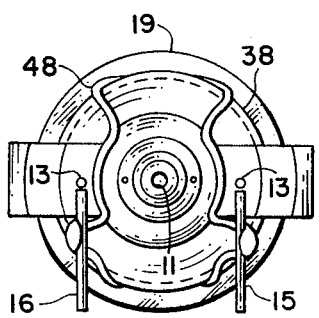
FIG. 6 shows another embodiment of the feeder tube fastener means.

As seen in FIG. 6, the feeder tubes 15 and 16 may be attached to the nozzle cap 38 by means of a snap-on assembly 48, eliminating the need for any actual changes in the conventional nozzle cap 38.

Figure 2:
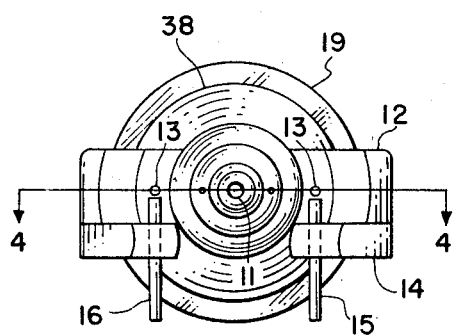
FIG. 2 shows a front view of the nozzle of FIG. 1.

The feeder tubes 15 and 16 have openings 23 and 24 which are positioned in front of and adjacent to the high speed stream of air emitted from the wing outlet holes 13 (FIGS. 2 and 3) so that a vacuum is formed over them. The vacuum provides an aspiration force for the additive materials contained in the reservoir source containers 27 and 28 whereby said materials may be proportionately mixed into the central spray in a manner to be explained more fully hereinafter. The additive material is carried from the reservoir source containers 27 and 28 to the feeder tubes 15 and 16 by pickup tubes 25 and 26. These pickup tubes 25 and 26 are preferably of the flexible type, and may be of some type of nonreactive plastic synthetic.

Figure 5:
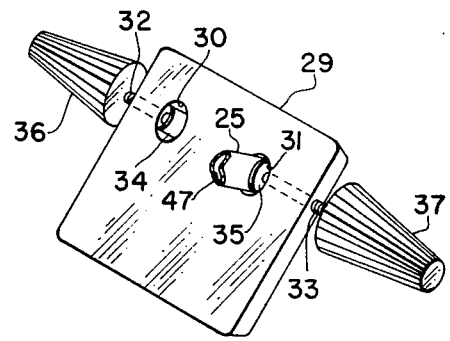
FIG. 5 shows the means for controlling the amounts of other material added to the central spray.

The control (FIG. 5) for the rate of flow of additive material through the feeder tubes 15 and 16 may be located on the pickup tubes 25 and 26 remotely from the fan wing 12 and separate from the central spray fanning control 43. In this respect, it may be attached (as in FIG. 1) to the central nozzle reservoir 41, or just located along the pickup tubes in a place convenient to the person using the spray apparatus. Referring now to FIG. 5, it may be seen that the control comprises a suitable block frame 29 which has bored out apertures 30 and 31. The flexible pickup tubes 25 and 26 pass through these apertures. Threaded openings having screw means 32 and 33 therein are located on the sides of the block frame 29 and abut the apertures 30 and 31 perpendicularly. The screw means 32 and 33 are connected at the aperture end to pressure plates 34 and 35 by a journaled connection, and at the other end fixedly to adjustment knobs 36 and 37. The pressure plates 34 and 35 are located within the apertures 30 and 31 and conform to the reversed arced surface of the bore. These pressure plates 34 and 35 may be actuated by turning the adjustment knobs 36 and 37. In this way, the plates may be laterally displaced against the sides of the flexible pickup tubes 25 and 26 which pass through the apertures 30 and 31. This displacement has the effect of varying the cross-sectional area 47 of the pickup tubes 25 and 26 thereby controlling the rate of flow of the additive materials through said pickup tubes.

The improved spray gun operates as follows. The central nozzle 11 sprays a material in the conventional manner. At the same time, air passes through the air passages 17 and 18 and out of wing outlet holes 13 at a high rate of speed. This jet airstream may be regulated in the conventional manner by the top controls 43 and 44 which protrude from the back of the handle of the gun 39 in conjunction with the central nozzle spray so as to determine the fan shape and intensity of the central nozzle spray. As the jet airstream emerges from the wing outlet holes 13, it passes over the openings 23 and 24 in the additive material feeder tubes 15 and 16. In so doing, it acts as an aspirator, providing a lift force for the liquid in the reservoirs and in the feeder tubes. The jet airstream further acts as a dispersing means and carries the dispersed additive material into the path of the centrally sprayed material, resulting in the mixture taking place externally of the spray gun nozzle cap 10. The amount of other material added to that contained in the central spray is controlled by controlling the rate that such material can flow out of the feeder tubes 15 and 16. This is done by positioning pressure control means on pickup tubes 25 and 26 (as hereinbefore more fully described).

The many advantages of the present invention should be readily understood from the above discussion of its features and operation. What has been provided is a device which may be easily obtained through the conversion of a conventional spray gun and nozzle apparatus. This may be accomplished by attaching the metal blocks 14 to the undersides of the fan wings 12 by brazing or other suitable methods, providing bores therein through which feeder tubes 15 and 16 may pass, and providing in said blocks some means such as tightening screws for adjustably affixing said tubes in said bores. Alternately, the feeder tubes 15 and 16 may be incorporated into a snap-on assembly 48 which can be easily added to the nozzle cap 38. Reservoir source containers 27 and 28 containing the additive material may be made of any suitable nonreactive material and can be attached to the conventional central nozzle reservoir container 41 by a clamping band 44 or other suitable attaching means. Flexible pickup tubes 25 and 26 are provided to carry the additive material from said reservoir source containers to the feeder tubes 15 and 16 where it may be mixed with the central spray in the manner hereinbefore described. The means for controlling the amount and therefore proportion of material thus added to the central spray has been kept separate of the nozzle cap so as to allow the ready conversion of a conventional spray gun and nozzle apparatus into one having the advantages of the present invention. Keeping the flow controls separate eliminates complicated machining of the nozzle cap, allows proportional admixing of other materials to the central spray without interfering with the fan shape or intensity of said spray, and lets the ultimate user position them in a place most convenient to his individual needs. The present invention therefore results in a spray gun and nozzle apparatus for the combined spray application of at least three different materials including separate controls for the fan shape of the resulting spray and the proportion of each material in said resulting spray. The final result is an improved spraying apparatus which is easier to manufacture, easier to service, and as a result, less costly to the ultimate consumer.

What is claimed as new and desired to be secured by Letters Patent of the United States is:

1. An improved spray gun having a simplified replaceable nozzle cap comprising:
    a central nozzle for spraying a material;
    at least two fan wings;
    airstream outlet means located on said fan wings and positioned substantially forward of the central nozzle;
    a feeder tube attached to each fan wing adjacent the outer edge of the wing outlet hole and having openings at one end adjacent to a jet airstream emanating from said fan wing outlets, said jet airstream acting as an aspirator;
    reservoir source containers holding other material, said other material to be admixed with the nozzle sprayed material;
    pickup tubes connecting the feeder tubes to the other material reservoir source containers; and
    means for separately controlling the rate of flow of the other materials out of the feeder tubes, said control means located remotely from the nozzle cap.

2. The improved spray gun as in claim 1 wherein the the externally located feeder tubes are held in place by fastener means so as to be readily removable for cleaning and replacement.

3. The improved spray gun as in claim 1 wherein the rate of flow controlling means includes pressure control means located on the pickup tubes and remotely from the feeder tubes.

4. The feeder tube rate of flow controlling means of claim 3 comprising a suitable block frame; bored out apertures therein; pressure plates located in said apertures; pickup tubes passing through said apertures; and means for actuating said pressure plates so as to regulate the flow of liquid through said tubes by decreasing their inner cross-sectional areas.

5. The improved spray gun as in claim 3 wherein said control means includes a suitable block frame; apertures formed therein through which the pickup tubes pass; pressure screw means mounted in the frame comprising screw means, a cylindrical segment pressure plate located at one end of the screw means and in the aperture between the wall of the aperture and the outside of the pickup tubes, and adjustment knobs attached to the other end of the screw means, said adjustment knobs used to put lateral pressure on the sides of the pickup tubes thereby controlling the rate of flow of liquid through said tubes.

6. The improved spray gun as in claim 1 wherein the wing outlet means has at least two air passages, said air passages terminating in a wing outlet hole located on the inner side of the fan wing; means for providing a high speed flow of air through said air passages, said high speed flow of air acting as an aspirator and dispenser means for the other material.

7. The improved spray gun as in claim 1 wherein said feeder tubes are incorporated into a resilient frame snap on snap off assembly which may be quickly and easily fastened to and removed from a conventional spray gun nozzle cap.

References Cited

UNITED STATES PATENTS

| | | | |
|---|---|---|---|
| 2,148,047 | 2/1939 | Epstein | 239—306 XR |
| 2,513,081 | 6/1950 | Clark et al. | 239—307 |
| 2,904,262 | 9/1959 | Peeps | 239—290 XR |
| 3,179,341 | 4/1965 | Plos et al. | 239—307 XR |
| 3,252,657 | 5/1966 | Winegar | 239—296 |
| 3,344,992 | 10/1967 | Norris | 239—290 XR |

M. HENSON WOOD, Jr., Primary Examiner

G. A. CHURCH, Assistant Examiner

U.S. Cl. X.R.

239—290, 307, 318